US009637608B2

(12) United States Patent
Rosen

(10) Patent No.: US 9,637,608 B2
(45) Date of Patent: May 2, 2017

(54) BIODEGRADABLE PLASTICS, METHOD FOR PRODUCTION THEREOF AND USE THEREOF

(71) Applicant: AKTEC DEVELOPMENT LIMITED, Central H.K. (HK)

(72) Inventor: Ake Rosen, Cannes (FR)

(73) Assignee: AKTEC DEVELOPMENT LIMITED, Central H.K. (HK)

( * ) Notice: Subject to any disclaimer, the term of this patent is extended or adjusted under 35 U.S.C. 154(b) by 315 days.

(21) Appl. No.: 14/399,713

(22) PCT Filed: Apr. 23, 2013

(86) PCT No.: PCT/SE2013/050438
§ 371 (c)(1),
(2) Date: Nov. 7, 2014

(87) PCT Pub. No.: WO2013/169174
PCT Pub. Date: Nov. 14, 2013

(65) Prior Publication Data

US 2015/0125639 A1 May 7, 2015

(30) Foreign Application Priority Data

May 7, 2012 (SE) ...................................... 1250465

(51) Int. Cl.
*C08K 3/26* (2006.01)
*C08L 67/00* (2006.01)
(Continued)

(52) U.S. Cl.
CPC .................. *C08K 3/26* (2013.01); *B32B 1/02* (2013.01); *B32B 5/16* (2013.01); *B65D 65/466* (2013.01);
(Continued)

(58) Field of Classification Search
CPC .......... C08K 3/26; C08K 3/265; C08K 3/267; C08L 67/00; C08L 67/02; C08L 67/03;
(Continued)

(56) References Cited

U.S. PATENT DOCUMENTS 4,126,593 A 11/1978 Takahashi
4,542,066 A 9/1985 Delzant
(Continued)

FOREIGN PATENT DOCUMENTS

EP 0 347 329 12/1989
EP 0 439 373 7/1991
(Continued)

OTHER PUBLICATIONS

Written Opinion of the International Searching Authority Issued Sep. 5, 2013 in PCT/SE13/050438 Filed Apr. 23, 2013.
(Continued)

*Primary Examiner* — Walter B Aughenbaugh
(74) *Attorney, Agent, or Firm* — Oblon, McClelland, Maier & Neustadt, L.L.P.

(57) ABSTRACT

The present invention concerns a plastic composition which is biodegradable, and which does not discharge contaminants during incineration or leave plastic fragments after decomposition. According to the invention the composition comprises: (i) 30-50% by weight of a polyester which is biodegradable and/or decayable; (ii) 20-40% by weight of starch from vegetable oil origin from corn, potatoes, and/or sunflower; (iii) 20-40% by weight of a filler composition comprising dolomite and/or calcium carbonate, wherein the filler composition particles have a polished surface; and (iv) 1-5% by weight of a binding agent comprising a resin ester of vegetable origin; wherein said polyester and said starch together form a bioplastic base composition and together comprise 55-79% by weight of the total weight of said
(Continued)

plastic composition. The present invention further concerns a method for preparing said plastic composition; a plastic film prepared of said plastic composition; and a waste bag prepared of said plastic film.

20 Claims, 4 Drawing Sheets

(51) Int. Cl.

| | |
|---|---|
| ***C08L 67/04*** | (2006.01) |
| ***B65D 65/46*** | (2006.01) |
| ***B32B 5/16*** | (2006.01) |
| ***C08L 67/02*** | (2006.01) |
| ***C08L 67/03*** | (2006.01) |
| ***B32B 1/02*** | (2006.01) |
| ***C08J 5/10*** | (2006.01) |
| ***C08J 3/20*** | (2006.01) |
| ***C08J 5/18*** | (2006.01) |
| ***C08L 3/02*** | (2006.01) |
| ***C08L 3/00*** | (2006.01) |
| *B09B 3/00* | (2006.01) |
| *C08L 101/16* | (2006.01) |

(52) U.S. Cl.

CPC ................ *C08J 3/203* (2013.01); *C08J 5/10* (2013.01); *C08J 5/18* (2013.01); *C08L 3/00* (2013.01); *C08L 3/02* (2013.01); *C08L 67/00* (2013.01); *C08L 67/02* (2013.01); *C08L 67/03* (2013.01); *C08L 67/04* (2013.01); *B09B 3/00* (2013.01); *C08J 2300/16* (2013.01); *C08J 2367/04* (2013.01); *C08L 101/16* (2013.01); *C08L 2201/06* (2013.01); *Y02W 90/11* (2015.05); *Y02W 90/12* (2015.05); *Y02W 90/13* (2015.05); *Y10T 428/131* (2015.01); *Y10T 428/1334* (2015.01); *Y10T 428/1345* (2015.01); *Y10T 428/1348* (2015.01); *Y10T 428/1352* (2015.01); *Y10T 428/1372* (2015.01); *Y10T 428/1397* (2015.01)

(58) Field of Classification Search

CPC ........... C08L 67/04; C08L 101/16; C08J 5/10; B65D 65/46; B65D 65/466; B32B 1/02; B32B 5/16; Y10T 428/131; Y10T 428/1334; Y10T 428/1345; Y10T 428/1348; Y10T 428/1352; Y10T 428/1372; Y10T 428/1397

See application file for complete search history.

(56) References Cited

U.S. PATENT DOCUMENTS

| | | | | |
|---|---|---|---|---|
| 5,206,087 | A * | 4/1993 | Tokiwa | C08L 101/00 428/325 |
| 5,462,983 | A * | 10/1995 | Bloembergen | C08L 3/06 523/128 |
| 5,910,520 | A | 6/1999 | Dabi et al. | |
| 2011/0172326 | A1 | 7/2011 | Weismann et al. | |
| 2012/0196950 | A1 | 8/2012 | Weismann et al. | |

FOREIGN PATENT DOCUMENTS

| | | |
|---|---|---|
| EP | 0 606 923 | 7/1994 |
| GB | 2 127 009 | 4/1984 |
| KR | 10 2009 0008117 | 1/2009 |
| WO | 00 31166 | 6/2000 |
| WO | 2009 077860 | 6/2009 |
| WO | 2013 061068 | 5/2013 |

OTHER PUBLICATIONS

International Search Report Issued Sep. 5, 2013 in PCT/SE13/050438 Filed Apr. 23, 2013.

Extended European Search Report issued Nov. 10, 2015 in Patent Application No. 13788002.7.

* cited by examiner

BIODEGRADABLE PLASTICS, METHOD FOR PRODUCTION THEREOF AND USE THEREOF

TECHNICAL FIELD

The present invention relates to a plastic composition which is biodegradable, and which does not discharge contaminants during incineration or leave plastic fragments after decomposition. The present invention further relates to a method for preparing said plastic composition; a plastic film prepared of said plastic composition, and a waste bag prepared of said plastic film.

BACKGROUND

More and more domestic establishments are urged to separately gather organic waste, such as food scraps, waste products from food preparation, garbage and so forth. On commercial basis, this is done for composting and biogas preparation. The domestic establishments are today offered paper bags for the gathering of organic waste. However, the paper bags are bulky to distribute and store, and when exposed to moisture, the paper bags weakens. When a paper bag filled with moistures organic waste is to be lifted over to an outdoor waste container, paper rupture may occur, whereby the organic waste may end up on the floor indoors or on the driveway outside the house. During cold seasons with outdoors temperatures below 0° C., other problems may arise. The moisture from the organic waste may penetrate the paper bag wall, and with temperatures below 0° C., the paper bags may freeze onto each other and onto the inner walls of the outdoor waste container, which will raise difficulties during garbage collection.

Additional problems with the paper bag for organic waste are that the paper bag is not possible to seal before being placed in the outdoor waste container, which may give rise to problems with blowfly, maggots and odour during warm seasons.

Commercial decaying of organic waste is getting more and more frequent in order to produce biogas. The paper bags used as of today are degradable, but to slow for the commercial decaying process and therefore have to be separated from the organic waste before decaying. In order to solve the problem with paper rupture, the organic waste may be placed in biodegradable plastic bags. However, many of the biodegradable plastic bags of today are not degradable during the decaying process, and even if being degradable during the decaying process, the plastic bags still needs to be grinded together with the organic waste before decaying in order to reduce the decaying process time. Some grinds which are today arranged to grind the waste bags of paper will not be able to grind biodegradable plastic bags, as plastic bags usually are made of such thin films that the plastic bags will pass the mill without being grinded completely. By proper choice of mill, such as a shredder mill, biodegradable plastic bags may be grinded to a proper degree.

Further important to understand is that even though the waste bag is produced from a biodegradable plastic film, the waste bag may not necessarily fulfil the environmental legislation for a waste bag which is allowed to be used in a decaying process. It is particularly important that the remaining digested sludge is free from plastic fragments, and many of the plastic films used today contain polyolefin, and polyolefin are not biodegradable. Instead plastic films containing polyolefin ends up as plastic fragments within nature.

Thus, there is a need for an improved biodegradable plastic film material which may be used for waste bags for collection of organic waste for decomposition and decaying, and especially for decaying.

SUMMARY OF INVENTION

One object of the present invention is to provide a plastic composition which is biodegradable, and which does not discharge contaminants during incineration. A further object of the present invention is to provide a plastic composition which does not leave plastic fragments after degrading.

Another object of the present invention is to provide a method for preparing a plastic composition.

Yet other objects of the present invention is to provide a plastic film produced from said plastic composition, to provide a plastic film produced according to said method, and to provide a waste bag prepared of said plastic film.

The present invention concerns a plastic composition which is biodegradable, and which does not discharge contaminants during incineration or leave plastic fragments after decomposition. According to the invention the composition comprises: (i) 30-50% by weight, based on the total weight of the plastic composition, of a polyester which is biodegradable and/or decayable; (ii) 20-40% by weight, based on the total weight of the plastic composition, of starch from vegetable oil origin from corn, potatoes, and/or sunflower; (iii) 20-40% by weight, based on the total weight of the plastic composition, of a filler composition comprising dolomite and/or calcium carbonate, wherein the filler composition particles have a polished surface; and (iv) 1-5% by weight, based on the total weight of the plastic composition, of a binding agent comprising a resin ester of vegetable origin; wherein said polyester and said starch together form a bioplastic base composition and together comprise 55-79% by weight of the total weight of said plastic composition.

Hereby an improved plastic composition is provided, which plastic composition is feasible to grind together with organic waste with sufficient result, and which thereafter is decayable. Dolomite and/or calcium carbonate will not influence the process of decaying, but will act as a soil improvement agent when the digested sludge is distributed out on the fields as it will provide pH increasing, which is favourable for soil deficient in lime. Further, the addition of dolomite and/or calcium carbonate will make the plastic composition possible to tear with sustained flexibility. Even further, as the filler composition has a polished surface, the wear of the machinery during mixing and extrusion of the plastic composition will be decreased.

In one embodiment said plastic composition comprises (i) 35-45% by weight, based on the total weight of the plastic composition, of a polyester which is biodegradable and/or decayable; (ii) 25-30% by weight, based on the total weight of the plastic composition, of starch from vegetable oil origin from corn, potatoes, and/or sunflower; (iii) 25-35% by weight, based on the total weight of the plastic composition, of a filler composition comprising dolomite and/or calcium carbonate, wherein the filler composition particles have a polished surface; and (iv) 1-5% by weight, based on the total weight of the plastic composition, of a binding agent comprising a resin ester of vegetable origin, wherein said polyester and said starch together form a bioplastic base composition and together comprise 60-74% by weight of the total weight of said plastic composition.

In another embodiment said plastic composition comprises (i) 40-42% by weight, based on the total weight of the plastic composition, of a polyester which is biodegradable and/or decayable; (ii) 25-27% by weight, based on the total weight of the plastic composition, of starch from vegetable oil origin from corn, potatoes, and/or sunflower; (ii) 30% by weight, based on the total weight of the plastic composition, of a filler composition comprising dolomite and/or calcium carbonate, wherein the filler composition particles have a polished surface; and (iv) 1-5% by weight, based on the total weight of the plastic composition, of a binding agent comprising a resin ester of vegetable origin; wherein said polyester and said starch together form a bioplastic base composition and together comprise 65-69% by weight of the total weight of said plastic composition.

In one embodiment of the present invention at least 90% of said filler has a particle size of 1-2 μm, and preferably 98% of said filler composition has a particle size of 1-2 μm. The rest of the filler composition, also named as "top cut", should have a particle size of less than 10 μm, preferably less than 8 μm. By limiting the top cut to a particle size less than 10 μm, the products produced with the plastic composition according to the invention will have requisite strength.

The filler composition according to the present invention has a polished surface, such that substantially no sharp edges remain on the surface of the filler composition particles. Removing substantially all the sharp edges of the filler composition particles will increase tear strength and will limit the apparatus wear during processing thereof.

In one embodiment of the present invention said filler composition is dolomite.

In one embodiment of the present invention said resin ester is pine resin, and in a further embodiment of the present invention said resin ester has a molecular weight of less than 10 000 g/mol. In one embodiment of the present invention said resin ester has a molecular weight between 1000-10 000 g/mol. By using a binding agent with low viscosity a proper wetting of the filler material is provided, and the binding agent will to some extent penetrate the wall surface of the filler composition particles. This will enhance the usability of the plastic composition and the products produced thereof, as the binding between the filler composition and the bioplastic base component is enhanced. When plastic bags, such as waste bags, are produced of the plastic composition in which the binding agent has wetted the wall surface of the filler composition particles or even has to some extent penetrated the wall surface of the filler composition particles, welded seams will have improved strength in comparison with the use of a binding agent that does not wet the filler material to the same extent as in the present invention.

In another embodiment of the present invention said plastic composition may further comprise 0.5-1.5% by weight, based on the total weight of the plastic composition, of a moisture absorbent, preferably chosen from silica, $SiO_2$, and/or calcium oxide, CaO. When using a moisture absorbent within the plastic composition, the moisture absorbent will absorb water from the organic waste gathered in a waste bag produced of the plastic composition. During absorption of water from organic waste also bacteria will be absorbed which will initiate degrading and decaying. This will initiate and to some extent accelerate the degrading and decaying process.

In another embodiment of the present invention said plastic composition may further comprise 0.1-0.2% by weight, based on the total weight of the plastic composition, of iron oxide. The addition of iron oxide to the plastic composition will improve the UV-light initiated degradation of the plastic composition. By adding iron oxide to the plastic composition, the degradation may be regulated. The iron oxide may have an almost catalysing effect on the degradation.

The present invention further concerns a method for preparing a plastic composition according to claim 1. According to the invention the method comprises: (a) polishing filler composition particles of dolomite and/or calcium carbonate to remove sharp edges on the surface of the filler composition particles; (b) mixing said polished filler composition with a binding agent comprising a resin ester of vegetable origin during heating to provide wetting of said filler composition with said binding agent; (c) cooling said filler composition wetted with said binding agent during stirring to provide a non-sticky mixture thereof; (d) heat mixing a bioplastic base composition comprising (i) 30-50% by weight, based on the total weight of the plastic composition, of a polyester which is biodegradable and/or decayable; and (ii) 20-40% by weight, based on the total weight of the plastic composition, of starch from vegetable oil origin from corn, potatoes, and/or sunflower, wherein said bioplastic base composition comprises 55-79% by weight of the total plastic composition; thereafter, during continued mixing, (e) adding said non-sticky mixture of step (c) to said heat mixed bioplastic base composition; and (f) extruding the mixture of step (e) into granules of said plastic composition.

In one embodiment of the method according to the present invention, a moisture absorbent, preferably chosen from silica, $SiO_2$, and/or calcium oxide, CaO, is added in the mixing step (c).

In one embodiment of the method according to the present invention, iron oxide is added in the mixing step (c).

In another embodiment of the method according to the present invention, the mixing in step (e) is performed under air venting.

In one embodiment of the method according to the present invention, the mixing in step (e) is performed under controlled pressure, and in one such embodiment the pressure is controlled such that the temperature of the plastic composition is kept below 200° C. By controlling the pressure in order to keep the temperature below 200° C., the plastic composition is protected against heat decomposition.

The present invention also concerns a plastic film produced from the plastic composition according to the present invention, and a plastic film produced by to the method according to the present invention.

In one embodiment of the plastic film according to the present invention, micro cracks have been provided within the plastic film by stretching said plastic film after production thereof.

The present invention further concerns a waste bag prepared of the plastic film according to the present invention.

The advantages referred to above concerning the plastic composition are in pertinent parts also true for the plastic film prepared from said plastic composition according to the present invention and the waste bag according to the present invention.

Further, when a plastic component prepared of the plastic composition according to the present invention is used in a combustion process, examples of plastic components being plastic bags for remaining waste, coffins for cremating and so forth, the $CO_2$-discharge is reduced with up to 70% in comparison with combustion of a corresponding plastic component made of polyethylene.

DEFINITIONS

Figure 1:
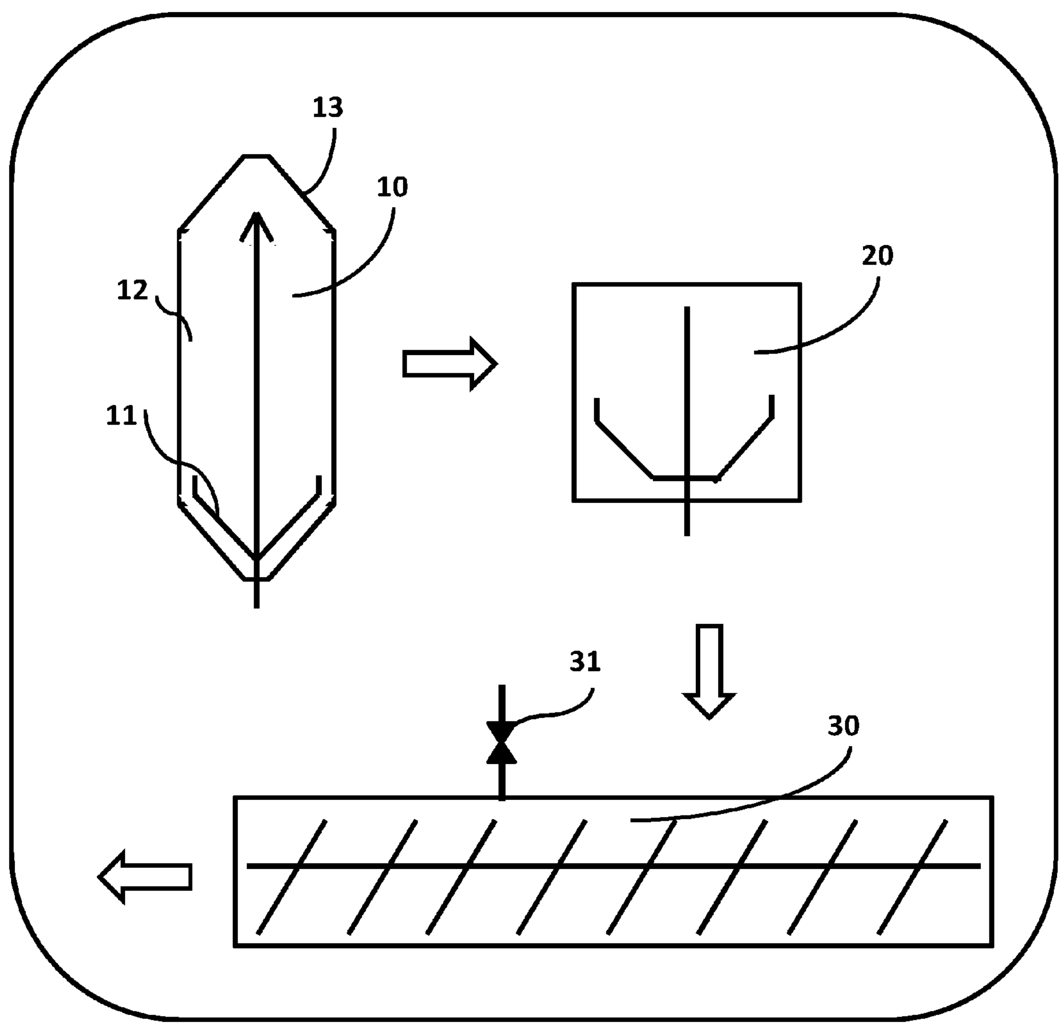
FIG. 1 shows a schematic view of a process line for the method according to one embodiment of the present invention.

The term "dolomite" means the mineral $CaMg(CO_3)_2$ or a commercially available product which is won from a natural occurring dolomite deposit or which is sold as "dolomite".

The term "biodegradable" means material which decomposes substantially fully, and which does not discharge contaminants during incineration or leave plastic fragments after decomposition.

The term "particle size" means, for a non-spherical particle, the diameter of a corresponding spherical particle which apart from material is identical with the non-spherical particle regarding volume, weight or area.

The term "top cut" means the largest particle size present. Thus, all particles have a size less than the top cut value.

The terms in the claims should have their general meaning within the technical area; unless any other definition has been give above. All referral to "a" or "the" "[plastic composition, layer, container, plastic film, waste bag]" should be read as a referral to at least one of said plastic composition, layer, container, plastic film, waste bag, etc. unless something else is specified.

DETAILED DESCRIPTION OF THE INVENTION

The present invention concerns a plastic composition which is biodegradable, and which does not discharge contaminants during incineration nor does it leave any plastic fragments after decomposition.

It is an international standard, called EN13432, which defines how rapid and in what extent a plastic material needs to degrade under commercial decomposition to be allowed to be named biodegradable. It is be noted that some plastic material, both petroleum based and biologically based plastic material, seems to be categorized as biodegradable according to this standard but ought not be categorized as such. Some of these plastic materials, such as polyethylene, are degraded by means of UV light and oxygen, i.e. not by microorganisms. However, such degradation will result in that the plastic molecular chains will only degrade to some extent. This will result in a scatter of plastic material in small fragments. These small fragments will eventually end up in the soil on the fields, which may give rise to environment issues. Thus, these plastic materials are not substantially fully biodegradable.

The plastic composition according to the present invention is however substantially fully biodegradable and will not discharge contaminants during incineration or leave plastic fragments after decomposition.

The plastic composition according to the present invention thus comprises (i) 30-50% by weight of polyester which is biodegradable and/or decayable;

(ii) 20-40% by weight of starch from vegetable origin from corn, potatoes, and/or sunflower;

(iii) 20-40% by weight of a filler composition; and (iv) 1-5% by weight of a binding agent, all percentages given are based on the total weight of the plastic composition, wherein said polyester and said starch together form a bioplastic base composition and together comprise 55-79% by weight of the total weight of said plastic film composition.

The plastic composition may further comprise 0.5-1.5% by weight of a moisture absorbent, and may even further comprise 0.1-0.2% by weight of iron oxide, again all percentages given are based on the total weight of the plastic composition.

In one embodiment of the present invention the plastic composition comprises 35-45% by weight, based on the total weight of the plastic composition, of polyester which is biodegradable and/or decayable, and 25-30% by weight, based on the total weight of the plastic composition, of starch from vegetable oil origin from corn, potatoes, and/or sunflower, wherein said polyester and said starch together comprise 60-74% by weight of the total weight of the plastic composition.

In another embodiment of the present invention the plastic composition comprises 40-42% by weight, based on the total weight of the plastic composition, of polyester which is biodegradable and/or decayable, and 25-27% by weight, based on the total weight of the plastic composition, of starch from vegetable oil origin from corn, potatoes, and/or sunflower, wherein said polyester and said starch together comprise 65-69% by weight of the total weight of the plastic composition.

In one embodiment of the present invention the biodegradable and/or decayable polyester may be a polyhydroxyalkanoate (PHA), a linear polyesters produced in nature by bacterial fermentation of sugar or lipids. Examples of such linear polyester are polyhydroxybutyrate (PHB), and derivates thereof, such as polycaprolactone (PLC). In industrial production of PHA, the polyester is extracted and purified from the bacteria by optimizing the conditions of microbial fermentation of sugar or glucose. As raw material for the fermentation, carbohydrates such as glucose and sucrose can be used, but also vegetable oil.

Figure 3:
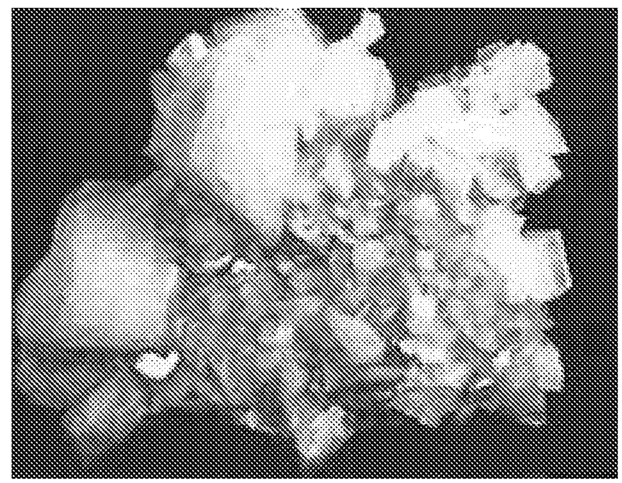
FIG. 3 shows an unpolished dolomite particle.
Figure 4:
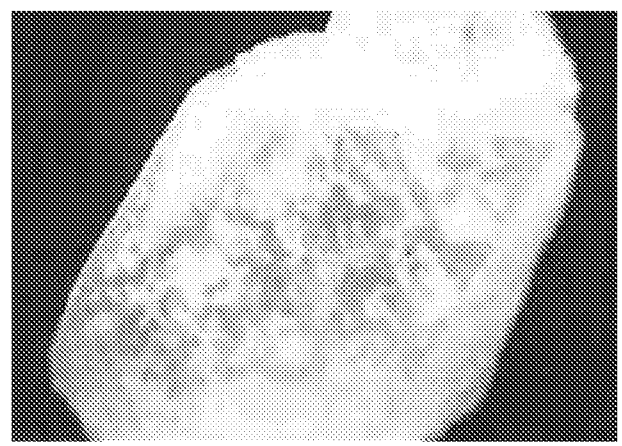
FIG. 4 shows a polished dolomite particle.

The filler composition may, according to the present invention comprise dolomite and/or calcium carbonate. Thus, it may comprise dolomite, or comprise calcium carbonate, or a mixture thereof. However, dolomite is a preferred filler composition according to the present invention. Dolomite is a mineral material comprising calcium magnesium carbonate ($CaMg(CO_3)_2$). The filler composition has a polished surface, and by polishing the surface thereof the filler composition particles do not give rise to tear initiation in a plastic film prepared from the plastic composition. In FIG. 3 an unpolished dolomite particle is shown, and in FIG. 4 is a polished dolomite particle shown. Thus, all the edges that may give rise to a tear initiation in a plastic film has been removed on the dolomite particle shown in FIG. 4, and a level surface is produced which is smooth without any sharp corners. In one embodiment the filler composition constitutes 20-40% by weight of the plastic composition. In another embodiment it constitutes 25-35% by weight and in one embodiment it constitutes 30% by weight of the total weight of the plastic composition.

At least 90% of the filler composition has further, according to one embodiment of the present invention, a particle size of 1-2 μm and a top cut of a particle size of less than 10 μm. In another embodiment the top cut has a particle size of less than 8 μm.

Further, in one embodiment about 98% of the filler composition has a particle size of 1-2 μm, and the top cut corresponds to 2% of the filler composition. Thus, 98% of the particles have a size of 1-2 μm and 2% of the particles have a size of 2-10 μm or 2-8 μm.

The binding agent may, according to the present invention comprise a resin ester of vegetable origin, and in one embodiment the resin ester is pine ester. Resin esters impart excellent specific adhesion to a wide range of substrates due to their polarity and polymer compatibility. Their low molecular weight distribution, combined with their cycloaliphatic aromatic structure, make resin esters the most broadly compatible of all adhesive tackifiers. Pine ester is one such resin ester. In one embodiment of the present invention the resin ester may have a molecular of below 10 000 g/mol and in another embodiment of the present invention said resin ester has a molecular weight of between 1000-10 000 g/mol. With a low molecular weight the resin ester becomes more compatible with the bioplastic base composition. The resin ester should also have a low viscosity. The lower the viscosity of the resin ester is the better the wetting and penetrating of the resin ester on and into the filler composition becomes. The binding agent normally used within prior art, such as magnesium stearate and calcium stearate, will only form a layer around each filler composition particle, and will not penetrate the surface of the filler composition particles. Thus, using a resin ester as binding agent, instead of magnesium stearate or calcium stearate, will provide an improved binding between the filler composition and the bioplastic base composition. This increased binding will provide a more amorphous structure in the plastic film material with increased strength in both longitudinal and transverse directions in the plastic film material as such and in welded seams in bags produced of the plastic film material.

The plastic composition may further comprise moisture absorbent in an amount of 0.5-1.5% by weight based on the total weight of the plastic composition. Examples of moisture absorbents are silica, $SiO_2$, and calcium oxide, CaO. Also mixtures of moisture absorbents may be used. An advantage of using a moisture absorbent within the plastic composition is that ambient moisture may be absorbed, which will accelerate the startup of the degrading and decaying process. The ambient moisture may for example come from the organic waste, such as garbage and food waste, being placed in a waste bag produced of the plastic composition according to the present invention.

The plastic composition may even further comprise iron oxide in an amount of 0.1-0.2% by weight based on the total weight of the plastic composition. The iron oxide will contribute to improved decomposition during exposure to UV-light, and may even to some extent catalyze the decomposition. Thus, by adding iron oxide, the decomposition process may be controlled. The iron oxide may be chosen from the group comprising ferrihydrate, goethite, hematite or magnetite. The iron oxide may also be present naturally within the filler composition deposit and already be part of the filler composition material as such.

With the plastic composition according to the present invention it is sufficient with normal room temperature to initiate decomposition, while bioplastic compositions comprising polylactic acid according to prior art require a temperature of 70° C. for the decomposition to start.

Figure 5:
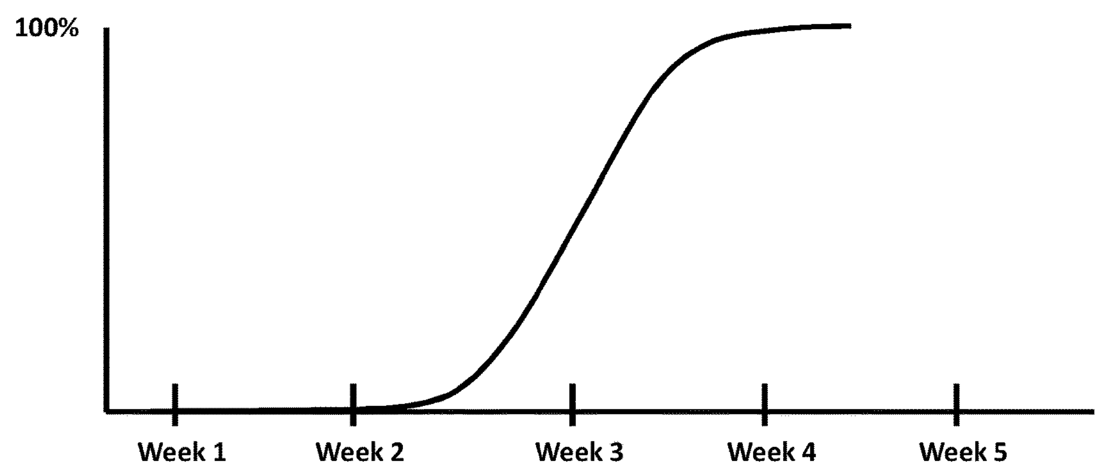
FIG. 5 shows the decomposition time of a plastic film according to one embodiment of the present invention.

Test measurements have shown that at a temperature of 35-40° C., which is a normal degrading temperature, a plastic film according to the present invention was completely decomposed after 30 days, see FIG. 5.

During a decaying process of the organic waste together with the plastic film according to the present invention, some of the plastic film will decay and give rise to biogas, and the remaining within the digested sludge will be spread out on the fields. Dolomite and/or calcium carbonate will not influence the decaying process, but will act as a soil improvement agent out on the fields as it will increase the pH, which is favourable for soil deficient in lime.

More and more, the governments strive to limit the use of non-renewable raw material, and presently there are discussions on-going concerning requirements of that at least 50% of the raw material used for biodegradable materials should come from renewable raw materials. The plastic composition according to the present invention fulfils this requirement. The filler composition is a neutral component within the plastic composition, as it is returned back to the nature in the same form as it is withdrawn from the nature. The resin ester and the starch according to the present invention come from vegetable origin, which is a renewable raw material, while the polyester available on the market as of today mostly is from non-renewable raw material, but also from renewable sources, such as PHA and PHB disclosed above. The plastic composition according to the present invention may only comprise 30-50% by weight of a non-renewable raw material and therefore fulfils this new requirement. Additional polyesters from vegetable origin are under development and will soon reach the market. When the polyester in the plastic composition according to the invention is of vegetable origin, the plastic composition will comprise only renewable raw material.

The present invention further concerns a method for preparing a plastic composition according to above. The method according to the present invention comprises:

(a) polishing the surface of the filler composition;

(b) mixing said polished filler composition with a binding agent during heating;

(c) cooling said mixture of filler composition particles wetted with said binding agent;

(d) heat mixing a bioplastic base composition, (e) adding said mixture of step (c) to said heat mixed bioplastic base composition; and (f) extruding the mixture of step (e) into granules of said plastic composition.

If moisture absorbent is to be included in the plastic composition, this moisture absorbent may be added during the mixing step (c).

If iron oxide is to be included in the plastic composition, it may be added during the mixing step (c).

The granules of said plastic composition may then be used for production of a plastic film. In one embodiment, and especially if the plastic film produced is to be used for waste bags, plastic bags for fruit, sanitary towels or other applications in which permeable plastic film is preferred, the prepared plastic film may be stretched to provide micro cracks within the plastic film.

The granules of said plastic composition may further be used for production of e.g. plant pots, urns, and coffins.

In one embodiment of the present invention, the method steps (d), (e) and (f) are performed in a twin screw extruder. In one embodiment of the present invention air venting and/or degassing is performed during step (e). In one embodiment of the present invention the method steps (d), (e) and (f) is performed during controlled pressure. It may be important to keep the temperature below 200° C., and this may be controlled by pressure adjustments.

During the polishing of the filler composition particles, the sharp edges of the particles are removed and the filler composition receives a smooth and edge free outer surface. FIG. 3 shows a dolomite particle in its natural stage after ordinary grinding into correct particle sizes, and FIG. 4 shows a dolomite particle after having been polished. When the sharp edges is removed from the filler composition particles, possible tear initiation points within plastic film produced from the plastic composition is reduced, and a plastic film with enhanced tear strength is provided. The machinery wear during mixing and extrusion is also decreased when having the surface of filler composition particles polished.

Figure 2A:
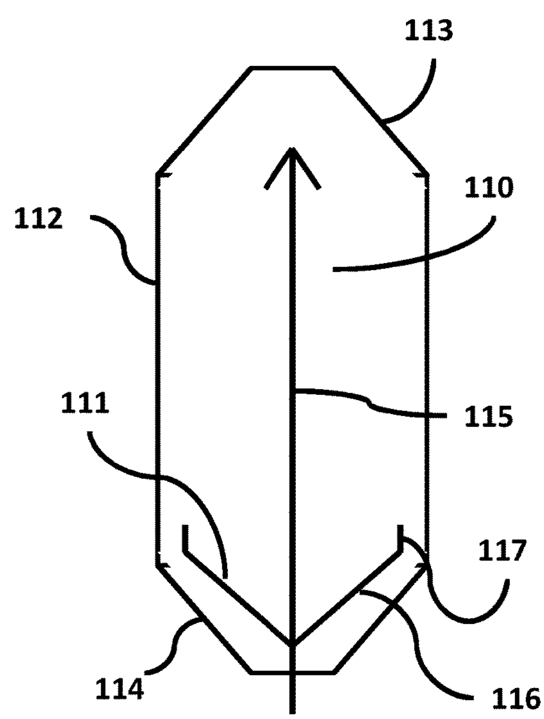
FIGS. 2*a* and 2*b* show schematic views of two embodiments of a polishing and a mixing apparatus as used in the process line of FIG. 1.
Figure 2B:
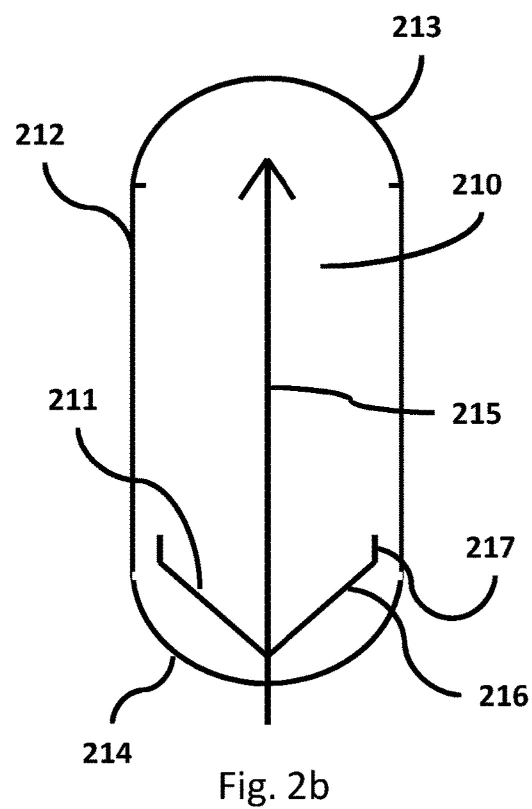

The polishing apparatus to be used for this process step is also disclosed. Two embodiments thereof are shown in FIG. 2A and FIG. 2B. According to a first aspect this apparatus (110, 210) comprises a container with cylindrical vertical wall (112, 212), a top surface (113, 213), a bottom surface (114, 214), at least one inlet (not shown), at least one outlet (not shown), and a stirring device (111, 211). In a second aspect, the inner wall of said vertical wall (112, 212) is surface treated to provide a rough surface. One example of such a surface treatment is sand-blasting. In a third aspect of this apparatus, the top surface is dome shaped (213) or trapezium (113). In a fourth aspect of this apparatus, said at least one inlet is arranged in said top surface, and said at least one outlet is arranged in said bottom surface, or in a lower part of said cylindrical vertical wall. In a fifth aspect of this apparatus, said bottom surface is inversely dome shaped (214) or inversely trapezium shaped (114). In a sixth aspect of this apparatus, said inner wall of the dome shaped or said trapezium shaped top surface is at least in the lower part adjacent the cylindrical vertical wall surface treated to provide a rough surface. Again, one example of such a surface treatment is sand-blasting. In a seventh aspect of this apparatus, said stirring device (111, 211) is a high speed stirring device, having an axis (115, 215) centrally extending in the vertical direction. According to an eight aspect the stirring device comprises radial extending wings (116, 216) arranged in the lower part of the container. According to a ninth aspect said radial extending wings are inclined towards the central axis. Thus, the radial extending wings have a lower vertical position at the central axis in comparison with the outer end thereof. In a tenth aspect of this apparatus, the radial extending wings have arranged in the outer end thereof an edge (117, 217) with an inclination different to the radial extending wings. In an eleventh aspect the inclination of said edge is less steep than the inclination of the radial extending wings. In a twelfth aspect the inclination of said edge is steeper than the inclination of the radial extending wings, and in a thirteenth aspect the edge is vertically arranged in the outer end of the radial extending wing. In a fourteenth aspect of this apparatus, said stirring device is arranged to spin a particulate material towards the inner walls of the vertical cylinder wall, and in some embodiment even towards the inner wall of the dome shaped or trapezium shaped top surface to thereby polish the surface of the particulate material. In a fifteenth aspect of this apparatus, said particulate material is dolomite and/or calcium carbonate.

The mixing of the polished filler composition particles and the binding agent is performed under heating, preferably at a temperature of about 70-90° C., in order to make sure that the filler composition particles are wetted properly with the binding agent. Asserting a proper wetting of the filler composition particles is important for the tear strength of the plastic film, as explained above.

After finalizing the mixing of the filler composition and the binding agent, the mixture is cooled down to a temperature at which the mixture is no longer sticky.

The bioplastic base composition comprising polyester and starch, as disclosed above, is heat mixed during continued mixing. This mixing is preferably performed in an extruder, most preferably a twin-screw extruder.

The non-sticky mixture of filler composition and binding agent is thereafter added to the heat mixed bioplastic base composition and mixed into a plastic composition; where after the plastic composition is extruded into granules.

During the mixing step (e) air enclosed in the non-sticky mixture of filler composition and binding agent may be vented out from the mixing device. This is preferably performed in a venting zone of an extruder. The internal pressure within the mixing/extruder device may have to be controlled to make sure that the temperature of the mixture is kept below 200° C., otherwise the plastic composition will be destroyed from a too high temperature.

Optionally a moisture agent and optionally iron oxide may be added during the cooling of the filler composition wetted with said binding agent.

The granules of the plastic composition may then be used for production of plastic film material.

The plastic film has in one embodiment a wall thickness of 10-50 μm. If the plastic film is to be used for waste bags the wall thickness may be within the range of 15-25 μm.

The plastic film may be used for preparation of waste bags, plastic bags for fruit and/or vegetables, sanitary towels, etc.

The plastic composition may also be used in a multi-layer plastic film, where at least one layer comprises the plastic composition according to the present invention.

Waste bags may be provided in rolled up rolls where the waste bags are connected to each other with a weakening line. In comparison with the waste bags for organic waste of today, the waste bags according to the present invention in rolls require 10 times less storage space, which results in decreased storage and distribution costs.

The waste bag according to the present invention may be used for collecting organic waste for a couple of weeks without degrading or material rupture. The start up time of the degrading depends on temperature, humidity and moisture within the organic waste and the aerobic environment.

A waste bag with a wall thickness of 15-25 μm may easily be sealed by tying the opened end thereof. The waste bags may have handles; tabs or other arrangements for facilitate tying. By having the waste bag properly tied, the problems with blowflies, maggots and odour may be eliminated or at least decreased in comparison with the paper waste bags used as of today.

EXAMPLES

By way of examples, and no limitation, the following examples 1-5 identify a variety of plastic compositions pursuant to embodiments of the present invention, and example 6 identifies a method for preparation of plastic composition pursuant to an embodiment of the present invention. All percentages given in the tables below are % by weight and is based on the total weight of the plastic composition. "PC" stands for Plastic Composition. The polyester used in the examples below is polycaprolactone, and the starch is potato starch.

Example 1

An Embodiment a Plastic Composition

| Component: | |
|---|---|
| Bioplastic Base Component | 68% based on total weight of PC |
| polyester | 41% based on total weight of PC |
| starch | 27% based on total weight of PC |
| Filler Composition | |
| dolomite | 30% based on total weight of PC |
| Binding Agent | |
| pine ester | 2% based on total weight of PC |

Example 2

An Embodiment of a Plastic Composition

| Component: | |
|---|---|
| Bioplastic Base Component | 65% based on total weight of PC |
| polyester | 39% based on total weight of PC |
| starch | 26% based on total weight of PC |
| Filler Composition | |
| dolomite | 30% based on total weight of PC |
| Binding Agent | |
| pine ester | 4.5% based on total weight of PC |
| Moisture Absorbent | |
| Silica, $SiO_2$ | 0.5% based on total weight of PC |

Example 3

An Embodiment of a Plastic Composition

| Component: | |
|---|---|
| Bioplastic Base Component | 71% based on total weight of PC |
| polyester | 39% based on total weight of PC |
| starch | 32% based on total weight of PC |
| Filler Composition | |
| dolomite | 25% based on total weight of PC |
| Binding Agent | |
| pine ester | 4% based on total weight of PC |

Example 4

An Embodiment of a Plastic Composition

| Component: | |
|---|---|
| Bioplastic Base Component | 62% based on total weight of PC |
| polyester | 37% based on total weight of PC |
| starch | 25% based on total weight of PC |

-continued

| Component: | |
|---|---|
| Filler Composition | |
| dolomite | 33% based on total weight of PC |
| Binding Agent | |
| pine ester | 5% based on total weight of PC |

Example 5

An Embodiment of a Plastic Composition

| Component: | |
|---|---|
| Bioplastic Base Component | 68% based on total weight of PC |
| polyester | 41% based on total weight of PC |
| starch | 27% based on total weight of PC |
| Filler Composition | |
| dolomite | 28% based on total weight of PC |
| Binding Agent | |
| pine ester | 3.5% based on total weight of PC |
| Moisture Absorbent | |
| Silica, $SiO_2$ | 0.5% based on total weight of PC |

Example 6

An Embodiment of a Method for Preparation of Plastic Composition

Below an embodiment of a method for preparing a plastic composition is disclosed. Referral is made to FIG. 1. A plastic composition of example 1 was prepared.

The filler composition of example 1 is introduced in a polishing and mixing apparatus 10. The filler composition comprises dolomite and 98% of the particles have a particle size of 1-2 μm and a top cut, 2% of the particles, have a particle size of less than 8 μm. The stirring device 11 is rotated at high speed to spin the dolomite particles against the vertical inner walls 12 of the mixing apparatus and, dependent on the speed used, also against the lower part of the inner surface of the top surface 13. The inner walls have been surface treated to provide a rough surface against which the filler composition will become polished in order to remove any sharp edges of the filler composition particles. When the polishing is completed, a binding agent is added to the polished dolomite in the polishing and mixing apparatus. The binding agent added in this example is pine ester with a molecular weight below 10 000 g/mol. The polished dolomite is mixed with the pine ester at high speed mixing and under heating at a temperature of about 80° C.

After thorough mixing and proper wetting of the dolomite particles with the pine ester, the mixture is transferred to a low speed mixing container 20. In this low speed mixing container 20 the mixture is cooled under stirring to a temperature at which the mixture has become essentially non-sticky.

The bioplastic base components is added to a twin-screw extruder 30 and mixed therein under heating to a temperature of 180° C. The non-sticky mixture is thereafter introduced into the extruder and is therein mixed with the heated bioplastic base component into a plastic composition. The extruder is a twin-screw extruder having a venting zone therein provided with at least one air vent 31 for air venting and degassing. The plastic composition is mixed in the extruder and the pressure therein is controlled to keep the temperature below 200° C.

The plastic composition is thereafter extruded into granules of the plastic composition.

The granules were later on used for production of a plastic film with a thickness of 20 μm. The plastic film was thereafter stretched to create micro cracks in the plastic film to make the plastic film permeable.

While the present invention has been described in connection with what is presently considered to be the most practical embodiments, it is to be understood that the invention is not to be limited to the disclosed embodiments, but on the contrary, is intended to cover various modifications and equivalents included within the spirit and the scope of the appended claims.

The invention claimed is:

1. A plastic composition which does not discharge contaminants during incineration or leave plastic fragments after decomposition, the composition comprising:
- (i) 30-50% by weight of a polyester which is biodegradable and/or decayable, based on a total weight of the plastic composition;
- (ii) 20-40% by weight of starch from vegetable oil origin from corn, potatoes, and/or sunflower, based on the total weight of the plastic composition;
- (iii) 20-40% by weight of a filler composition comprising dolomite and/or calcium carbonate, based on the total weight of the plastic composition, wherein the filler composition particles have a polished surface; and
- (iv) 1-5% by weight of a binding agent comprising a resin ester of vegetable origin, based on the total weight of the plastic composition;

wherein the polyester and the starch together form a bioplastic base composition and together are 55-79% by weight of the total weight of the plastic composition, and wherein the plastic composition is biodegradable.

2. The plastic composition according to claim 1, wherein the filler composition is dolomite.

3. The plastic composition according to claim 1, wherein at least 90% of the filler composition has a particle size of 1-2 μm and a top cut of the filler composition has a particle size of less than 10 μm.

4. The plastic composition according to claim 1, wherein the resin ester is pine resin.

5. The plastic composition according to claim 1, wherein the resin ester has a molecular weight below 10,000 g/mol.

6. The plastic composition according to claim 1, wherein the plastic composition further comprises 0.5-1.5% by weight of a moisture absorbent, based on the total weight of the plastic composition.

7. The plastic composition according to claim 1, wherein the plastic composition further comprises 0.1-0.2% by weight of iron oxide, based on the total weight of the plastic composition.

8. A method for preparing the plastic composition according to claim 1, the method comprising:
- (a) polishing filler composition particles of dolomite and/or calcium carbonate to remove sharp edges on a surface of the filler composition particles;
- (b) mixing and heating the polished filler composition particles with the binding agent comprising the resin ester of vegetable origin thereby wetting the filler composition with the binding agent;
- (c) cooling and stirring the filler composition wetted with the binding agent thereby obtaining a non-sticky mixture thereof;
- (d) heat mixing the bioplastic base composition comprising (i) 30-50% by weight, based on the total weight of the plastic composition, of the polyester which is biodegradable and/or decayable; and (ii) 20-40% by weight, based on the total weight of the plastic composition, of starch from vegetable oil origin from corn, potatoes, and/or sunflower, wherein the bioplastic base composition is 55-79% by weight of the total plastic composition;

and thereafter, during continued mixing,
- (e) adding the non-sticky mixture to the heat mixed bioplastic base composition, thereby obtaining a further mixture; and
- (f) extruding the further mixture into granules of the plastic composition.

9. The method according to claim 8, further comprising adding a moisture absorbent during the cooling and stirring (c).

10. The method according to claim 8, further comprising adding iron oxide during the cooling and stirring (c).

11. The method according to claim 8, further comprising air venting during the adding the non-sticky mixture to the heat mixed bioplastic base composition (e).

12. A method for preparation of the plastic composition according to claim 8, further comprising controlling pressure while adding the non-sticky mixture to the heat-mixed bioplastic base composition (e) and while extruding the further mixture (f).

13. A plastic film obtained from the plastic composition of claim 1.

14. A plastic film obtained from a plastic composition prepared according to the method of claim 8.

15. The plastic film according to claim 13, wherein the plastic film is obtained by a process comprising stretching the plastic composition after production thereby providing micro cracks within the plastic film.

16. The plastic film according to claim 13, which has a layer thickness of 10-50 μm.

17. A waste bag comprising the plastic film of claim 13.

18. The plastic composition according to claim 6, wherein the moisture absorbent comprises silica and/or calcium oxide.

19. The method according to claim 9, wherein the moisture absorbent comprises silica and/or calcium oxide.

20. The plastic composition according to claim 1, wherein the polyester comprises a polyhydroxyalkanoate.

* * * * *